INVENTOR.
HERMAN M. VAN HIJFTE
BY
AGENT

United States Patent Office 3,281,837
Patented Oct. 25, 1966

3,281,837
RADAR APPARATUS PROVIDED WITH AN ARRANGEMENT REACTING TO INTERFERENCE AND JAMMING BY CHANGING EITHER THE POLARIZATION DIRECTION OF THE AERIAL SYSTEM OR THE CARRIER FREQUENCY OR BOTH
Herman M. van Hijfte, Hengelo, Netherlands, assignor to N.V. Hollandse Signaalapparaten, Hengelo, Netherlands, a firm of the Netherlands
Filed May 22, 1963, Ser. No. 282,493
Claims priority, application Netherlands, May 23, 1962, 278,804
13 Claims. (Cl. 343—7.3)

The invention relates to a radar apparatus provided with an arrangement reacting to interference and jamming by changing either the polarization direction of the aerial system or the carrier frequency or both. Such a radar apparatus has been described in the French patent specification 1,255,166 and Canadian Patent No. 648,567. This known apparatus examines the level of the energy received during the last part of the interval between two successive transmitter pulses. As a rule no echo pulses are received during this interval, so that all energy then received will be the result of interference or jamming. The said apparatus effects a change in the carrier frequency or the polarization direction or both if the energy received during the said interval exceeds a certain limit. It is a disadvantage of this apparatus that actually a sufficiently long interval during which no echo can be expected must be available between successive transmitter pulses. In modern apparatus such an interval is in many cases not available.

The invention is based on the fact that noise, interference and jamming have in many respects the same character and has for an object the creation of an anti-interference or anti-jamming arrangement which becomes operative as soon as the energy supplied by the receiver in a shape other than that of standard echo pulses with suitable intervals obtains too high a level.

In accordance with the invention, for this purpose the radar apparatus is built in such a way that the control voltage for the amplification of the radar receiver supplied by an automatic noise level limiting arrangement is also applied to an interference sensing circuit which controls a servo system for changing the polarization direction or the carrier frequency or both, the said interference sensing circuit being brought into a state in which it causes the said servo system to be operative if the said control voltage passes a certain given limit in a direction corresponding to a higher noise level.

In order to prevent the interference sensing circuit from reacting to short noise peaks, which is superfluous and therefore undesirable, the said circuit must be sluggish in operation. Preferably this sluggishness is obtained by using a Miller integrator. The voltage level at which the interference sensing circuit with a Miller integrator changes its state is preferably defined by an arrangement in which the input circuit of the integrator is connected by a first resistance to a circuit supplying the voltage to which the interference sensing circuit must react and by a second resistance to a point of constant potential.

When the control voltage supplied by the automatic noise level limiting arrangement oscillates around the level at which the interference sensing circuit changes its state, even the presence of the integrator may be insufficient to ensure a stable operation and to prevent the servo system from becoming intermittently operative.

According to the invention, in order to prevent such intermittent operation, a "carry on" circuit is applied in which as a result of a switch over of a contact of an interference sensing relay controlled by the interference sensing circuit ensuing from a change of state of the latter circuit in at least one of the two possible directions, a condenser is charged or discharged in a circuit connected to the input circuit of the Miller integrator in the interference sensing circuit, during which charging or discharging operation a potential is applied to the said input circuit which promotes the continuation of the state reached by the interference sensing circuit.

Such a carry on circuit can be built in such a way as to promote only the continuation of the state reached after a change of state in a certain predetermined direction, e.g. the state in which the servo system is caused to be operative, but preferably such a carry on circuit promotes the continuation of the one state as well as the other state of the interference sensing circuit after such a state has been reached.

In many cases it is important to interrupt the pulse transmission as soon as the servo system is made operative for effecting a change. This is especially important if the invention is applied for anti-jamming operation because it prevents the jamming transmitter from following the effected change in the polarization direction or in the carrier frequency. Preferably the aerial of the radar apparatus follows the direction of the interference during the interruption of the pulse transmission, for the interference may be produced by the target followed by the aerial; and it is also possible that the interference signals received are caused by the reflection of interference energy by the target followed. During this mode of operation the amplification must be controlled by the automatic gain control circuit of the radar system and not by the automatic noise level limiting arrangement, for the latter arrangement would adjust the noise to a level substantially lower than the level to which the automatic gain control circuit adjusts the energy which passes through the gates of the automatically following gate system, so that the level to which the automatic noise level limiting arrangement adjusts the noise energy which passes through the said gate system is too low for an efficient control of the aiming of the aerial.

A first embodiment of a radar apparatus according to the invention which interrupts the pulse transmission when interference signals which are too strong are received comprises an automatic gain control circuit connected behind an automatically following gate system as well as an automatic noise level limiting arrangement, the circuit as well as the arrangement having an output circuit through which it can supply a control voltage for the purpose of reducing the amplification of the receiver, the said two output circuits being each connected to an output circuit of an "OR" circuit, which applies to an amplification control connection of the receiver that one of the two control voltages which will cause the largest decrease in the amplification whilst a carry-on circuit as defined above is present which operates in both conditions of the interference sensing circuit, and the latter circuit, when it obtains the state in which it causes the servo system to be operative, causes, by means of contacts of an interference sensing relay controlled by the said circuit:

(1) The automatic noise level limiting arrangement to be disconnected from the "OR" circuit, (2) The input circuit of the interference sensing circuit to be switched over from the output circuit through which the noise level limiting arrangement supplies its control voltage to the output circuit through which the automatic gain control circuit supplies its control voltage, (3) A change in the fixed potential applied to the second of the two resistances connected to the input circuit of the Miller integrator in the interference sensing circuit, as a result of which the latter circuit can remain in the state in which it causes the servo system to be operative even if a voltage corresponding to a substantially higher amplification than the voltage which caused it to obtain the said state is applied to its input circuit, (4) A potential to be applied to the input circuit of the noise level limiting arangement which prevents it from producing a control voltage suitable for reducing the amplification, (5) The pulse transmission to be interrupted.

An even more efficient embodiment of a radar apparatus according to the invention effects the larger part of the required switching operations without the intermediary of an electromagnetic relay. It comprises an automatic gain control circuit connected behind an automatically following gate system as well as an automatic noise level limiting arangement, the said circuit as well as the said arangment having an output circuit through which it can supply a control voltage for the purpose of reducing the amplification of the receiver, the said two output circuits being each connected to an input circuit of an "OR" circuit, which applies to an amplification control connection of the receiver that one of the said two control voltages which will cause the largest decrease in amplification, the output circuit of the noise level limiting arangement being connected by a first circuit to the interference sensing circuit and by a second circuit to one of the input circuits of the "OR" circuit as well as to a voltage limiter, which limits the control voltage in this circuit to values which can cause no more than a predetermined limited reduction in the amplification, whilst the interference sensing circuit, in the state in which it causes the servo system to be operative, also causes the interruption of the pulse transmission.

Preferably the said second circuit comprises a resistance between the output circuit of the noise level limiting arrangement on the one hand and the voltage limiter and the input circuit of the "OR" circuit connected to the said second circuit on the other hand, whilst the voltage which is just sufficient to cause the interference sensing circuit to react by causing the servo system to become operative is nearly equal to the voltage at which the limiter operates and preferably corresponds to a slightly higher noise level than the latter voltage.

The invention will now be elucidated by describing two embodiments with reference to the annexed drawings.

Figure 1:
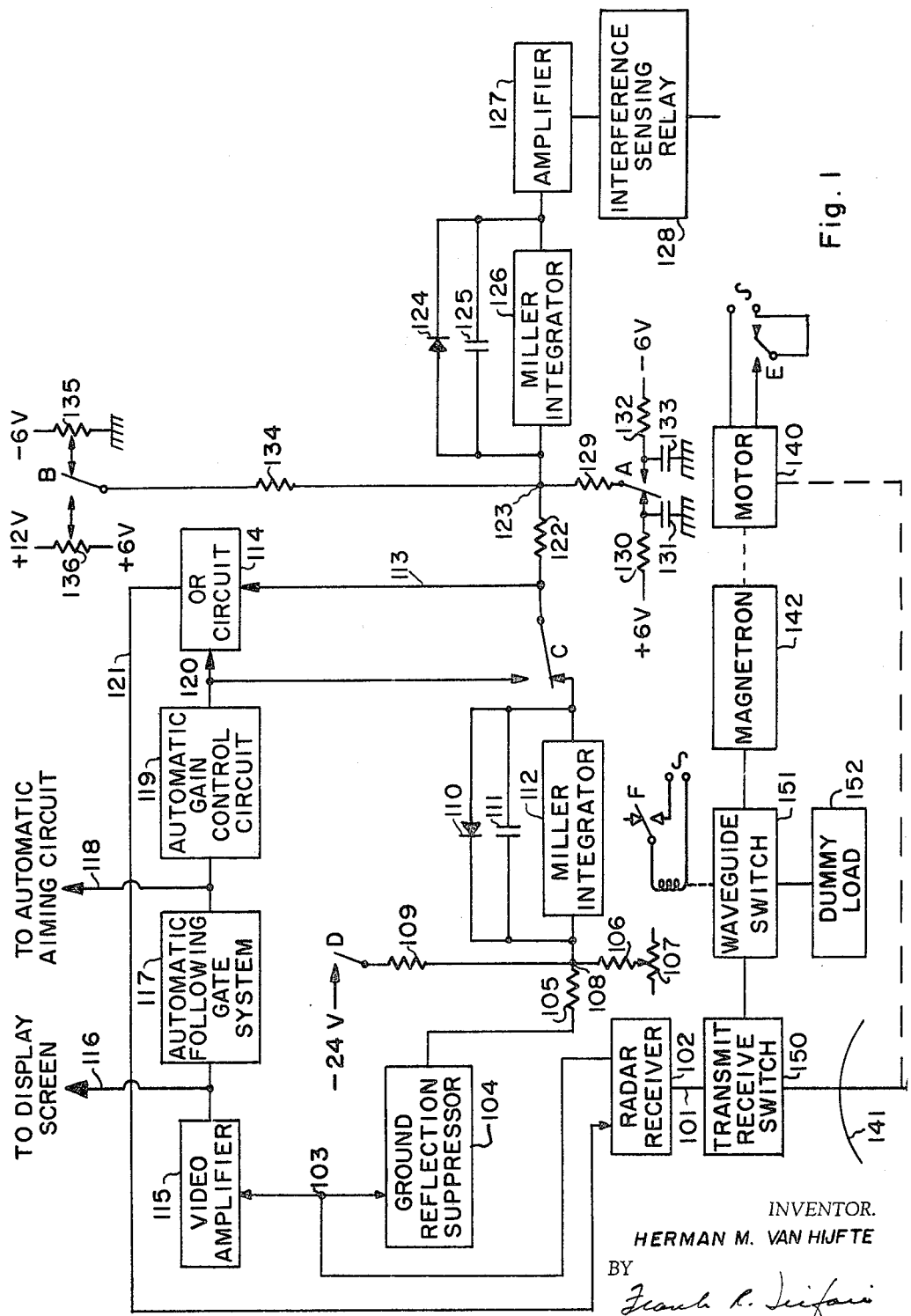
FIGURE 1 shows a first embodiment of a circuit of those parts of a radar apparatus according to the invention which are important in connection with the application of the invention.

In FIGURE 1 part 102 is a radar receiver to which energy received by an aerial is supplied through the input circuit 101 and which itself supplies video signals through its output circuit 103. These video signals are amplified in the video amplifier 115. The amplified video signals flow through the line 116 to a display screen not shown in the figure. Moreover, these video signals are supplied to an automatically following gate system 117 which selects the echo pulses received from a certain target after it has been synchronized with these echo pulses. By way of the line 118 these selected echo pulses flow to a circuit, not shown in the figure, for controlling the automatic aiming operation of the aerial. The selected echo pulses are also applied to an automatic gain control circuit 119 of a well known type. The object of this circuit is to prevent the echo pulses from obtaining such an amplitude that saturation and non-linearity will occur in one of the components of the circuit comprising the radar receiver, the autofollow circuit for controlling the aiming of the aerial connected to the line 118 and the parts of the said circuit situated in between. Such saturation and non-linearity would reduce the accuracy of the aiming of the aerial because as a result of these phenomena the variation in strength of the video-pulses controlling the autofollow circuit for aiming the aerial would be substantially less than the variation of the echo-pulses from which they are derived which echo-pulses vary in strength during each scanning cycle of the aerial, owing to the difference in direction of the aerial and of the target followed by the aerial. As soon as the automatic gain control circuit 119 receives pulses with too large an amplitude it produces at its output circuit 120 a voltage differing from the quiescent voltage of this output circuit, and this voltage is applied by way of the "OR" circuit 114 to the amplification control connection 121 of the receiver 102. The automatic gain control circuit is of the same type as the automatic noise level limiting arrangement which will be described below. Such a circuit is able to regulate a voltage applied to it practically without degree of variation, causing it to obtain a substantially constant value, at any rate in so far as the gain control range of the amplifier permits such a regulation.

The output voltage of the receiver is applied, moreover, by way of a ground reflection suppressor 104 to the automatic noise level limiting arrangement. The ground reflection suppressor is a gate circuit which is made non-conductive at the moment a transmitter pulse is emitted, and which becomes conductive again after an interval during which all ground reflections will have been received, even if the angle of sight has the smallest permissible value, so that this circuit rejects all ground reflections. The gate circuit can be controlled, for instance, by a mono-stable trigger circuit, which is brought into its non-stable state by each synchronizing pulse of the transmitter, making the gate circuit non-conductive in this state, and automatically returns to its stable state after the interval defined above. Without such a ground reflection suppressor the automatic noise level limiting arrangement would wrongly react to the ground reflections, by unnecessarily reducing the amplification of the receiver The voltages passing the ground reflection suppressor comprise apart from the echo pulses, all noise- and interference- and jamming voltages received during the interval in which the ground reflection suppressor conducts. In this combination of voltages the contribution of the echo pulses is negligible and in connection therewith in the description following below it will be given the name "noise" or "noise voltages." These noise voltages are applied to one end of a voltage divider 105, 106, a tap of which is connected to the input circuit 108 of a Miller integrator 112 with a condenser 111, and its other end is connected to a tap of the voltage divider 107. The latter voltage divider 107 is fed by a source of constant direct voltage and is adjusted in such a way that if the noise voltages supplied to its other end have just reached the highest permissible level then the voltage at the tap connected to the input circuit of the Miller integrator corresponds to that value which causes this integrator circuit to maintain its output voltage at a constant value. If the noise level differs from the value which is just permissible then the output voltage of the Miller integrator circuit will differ from its quiescent value. The Miller condenser 111 is bridged, however, by a diode 110 which limits the output voltage. As a result of this limiting operation the output voltage of the Miller integrator will change when the noise becomes too strong, but it will remain at its quiescent value if the noise is below the level which is just permissible. Consequently the Miller integrator will be able to supply without delay an output voltage differing from the quiescent value as soon as the noise level rises above the permissible value, even if the increase in noise is very rapid and the noise level has remained substantially below the limit level during a fairly long interval The output voltage of the Miller integrator can reach the control circuit 121 of the receiver by way of the circuit 113 and the "OR" circuit 114. The part of the circuit described above is neither new nor inventive; it operates as follows:

If neither echoes nor noise pass the gate system 117 there is no reason for the automatic gain control circuit 119 to reduce the amplification of the receiver and as far as this circuit is concerned the voltage at the amplification control connection 121 will have such a value that it permits the highest possible amplification in the receiver. The automatic noise level limiting arrangement which receives no noise voltages does not reduce the amplification either. If noise energy is received noise voltages are applied to the automatic gain control circuit as well as to the automatic noise level limiting arrangement. The level to which the automatic noise level limiting arrangement adjusts the noise voltages is, however, substantially lower than the level to which the automatic gain control circuit is arranged to adjust the voltages passing the gate system. Consequently the automatic noise level limiting arrangement becomes operative at a lower noise level than the automatic gain control circuit. When the noise level increases the former circuit supplies a control voltage for the purpose of reducing the amplification before the automatic gain control circuit is able to do so, and consequently the automatic noise level limiting arrangement controls the amplification control connection 121 by way of the "OR" circuit 114. By reducing the amplification it maintains the noise within the pre-arranged limits. Assume that echo pulses now start to pass the gate system 117. Up to a certain amplitude of these echo pulses the automatic gain control circuit remains in its quiescent state; beyond this amplitude it starts to supply a control voltage through its output circuit 120. If the noise level at this moment does not induce the automatic noise level limiting arrangement to produce a control voltage for reducing the amplification, the automatic gain control circuit will control the amplification control connection 121 by way of the "OR" circuit 114 as soon as it starts to produce an output voltage. If the noise level had such a value that it was necessary for the noise level limiting arrangement to reduce the amplification, then this arrangement had already applied a control voltage by way of the "OR" circuit 114 to the amplification control connection 121, which voltage caused a reduction in the amplification in the receiver. The amplification adjusted by the automatic noise level limiting arrangement is valid for the noise as well as for the echo pulses. Consequently the pulse voltages applied to the input circuit of the automatic gain control circuit 119 will not reach the limit at which the automatic gain control circuit becomes operative until the amplitude of the echo pulses received by the aerial exceeds a certain ratio with respect to the noise received. As soon as this is the case the echo pulses require a larger reduction in the amplification than the noise. The Miller circuit in the automatic gain control circuit 119 will then start integrating and will continue to do so until its output voltage surpasses that of the automatic noise level limiting arrangement. The automatic gain control circuit then controls the amplification control connection 121 by way of the "OR" circuit 114 in order to permit it to adapt the amplification to the strength of the echoes. The reduction in the amplification caused by the automatic gain control circuit will under these circumstances also cause the noise level at the input circuit of the automatic noise level limiting arrangement to be reduced, so that no further influence will be exerted by this arrangement.

Assuming that in this condition, in which the automatic gain control circuit controls the amplification in accordance with the strength of the echo pulses passing the gate system 117, the strength of the noise increases with respect to that of the echoes. At a certain input level of the noise the amplification adjusted in accordance with the received echoes results in a noise level at the output circuit of the receiver which exceeds the permissible value. The Miller integrator 112 then becomes operative and produces an output voltage which increases until it exceeds the control voltage supplied by the automatic gain control circuit, after which the automatic noise level limiting arrangement controls the amplification control connection 121 by way of the "OR" circuit 114 and takes over the task of regulating the amplification.

It may be derived from the above that the ratio of the strength of the noise and the strength of these echo pulses which further on in the system will pass the gate system, in the condition in which these phenomena are applied to the input circuit of the receiver, determines which of the two gain control circuits controls the amplification control connection. The value of the strength ratio at which the one circuit takes over the task from the other corresponds to the ratio of the limit levels to which the two control circuits are adjusted. If this ratio is exceeded at the input circuit of the receiver because the echo pulses are relatively too strong, then the automatic gain control circuit 119 is operative; if, however, the ratio is exceeded because the noise is relatively too strong, then the automatic noise level limiting arrangement is operative. The absolute value of the strength of the two phenomena has no influence on the moment of the switch-over from the arrangement to the circuit or back. The height of the control voltage is, however, determined by the strength of the phenomenon which dominates the situation at the moment. If the automatic noise level limiting arrangement is operative because the noise dominates, then the height of the control voltage is determined by the level of the noise; if the automatic gain control circuit 119 is operative because the echo pulses dominate, then the control voltage is determined by the strength of the echoes. A good insight into the above is very important for a complete understanding of the invention.

The circuit for making the anti-jamming arrangement operative, the so-called interference sensing circuit, will now be described. The control voltage supplied by the automatic noise level limiting arrangement to the conductor 113 is also applied to one end of a voltage divider 122, 134, a tap of which is connected to the input circuit 123 of a Miller integrator 126 with the condenser 125. The other end of the voltage divider is connected by way of the break contact of a change over contact B of the interference sensing relay to a tap of a voltage divider 135 fed by a constant direct voltage. The setting of the latter voltage divider defines up to which value of the voltage prouced by the automatic noise level limiting arrangement the integrator 126 in the interference sensing circuit remains in its quiescent state. A diode 124 bridging the condenser 125 limits the output voltage of the integrator in such a way that it remains at its quiescent value, even if the control voltage applied by the automatic noise level limiting arrannement to the circuit 113 corresponds to a lower noise level than the voltage defined by the adjustment of the voltage divider 135, at which the Miller integrator in the interference sensing circuit starts to integrate.

Consequently this integrator and the anti-jamming arrangement controlled by it can become operative without any delay even in cases in which a control voltage produced by the automatic noise level limiting arrangement corresponding to a very low level of the noise rapidly changes into a control voltage which is beyond the limit defined by the adjustment of the voltage divider 135 in a sense corresponding to a higher noise level. This is important, because such a rapid change in the control voltage may very well occur in connection with the character of the system.

After it has been amplified in an amplifier 127 the output voltage of the Miller integrator 126 controls the interference sensing relay 128. This relay makes the anti-jamming arrangement operative as soon as the output voltage of the integrator passes a certain limit in a given direction.

With the additions just described the system operates as follows: As long as the radar apparatus receives no substantial interference, the noise is below the level at which the automatic noise level limiting arrangement becomes operative. The automatic gain control circuit 119 regulates the amplification. As soon as the level of the noise, that is the level of the energy received from other sources than target echoes, increases in an unacceptable measure with respect to the strength of the target echoes, then, as described above, the noise level limiting arrangement with the Miller integrator 112 becomes operative. Under these circumstances various modes of operation are possible. If the echoes are weak, the automatic noise level limiting arrangement will take over the control of the amplification before the control voltage produced by it reaches the limit at which the interference sensing circuit becomes operative. If the echoes are very weak it may happen that the control voltage required for keeping the noise within the prearranged limits will be much too low to cause the interference sensing relay 128 to become operative, and that before this happens a substantial further increase in the level of the noise will be required. If, however, the strength of the echoes received by the aerial is sufficient for effectively controlling the auto-follow system for aiming the aerial, then, if the various limit values have been correctly adjusted, the automatic gain control circuit 119, in order to regulate the strength of the pulses applied to the gate system 117, will have already applied such a control voltage to the amplification control connection 121, that, if the noise level increases to an impermissible value with respect to the selected echoes, then, before the control voltage produced by the automatic noise level limiting arrangement has reached the value determined by the control voltage supplied by the automatic gain control circuit required for taking over the control of the amplification of the receiver it will already have reached the limit at which the interference sensing relay 128 becomes operative. As soon as the interference sensing relay 128 becomes operative it makes the servo system operative which then changes the polarization direction of the aerial or changes the carrier frequency of the transmitter and the receiver in a corresponding way. Arrangements for this purpose are well known in the art and will be discussed in more detail in the following disclosure. After the noise level has been sufficiently reduced by such a change, the value of the voltage produced by the automatic noise level limiting arrangement will no longer be able to keep the interference sensing circuit in its operative condition, so that this circuit returns to its quiescent state. It then switches off the servo system in the anti-jamming arrangement, which effected the change in the polarization direction or the frequency or both. The interference has then been eliminated.

In certain circumstances the relay 128 might operate in a hesitating way, for instance when the noise level oscillates around the permissible limit. It is obvious that such a hesitating operation during which the armature of the relay chatters and the anti-jamming arrangement becomes intermittently operative and non-operative is undesirable. If interference or jamming has been established even if its value has just reached the limit at which it becomes impermissible, it is nevertheless desirable to effect a substantial change in the carrier frequency or the polarization direction of the serial so that a sufficient distance from the range in which interference or jamming is present is reached. For this purpose the system is provided with, a circuit to which the name "carry-on circuit" has been given. The carry-on circuit applied in the embodiment described comprises two condensers 131 and 133 and a change over contact A of the interference sensing relay 128. In the circuit described the control voltage produced by the automatic noise level limiting arrangement is negative. The relay 128 becomes operative as soon as this control voltage is more negative than a certain limit value. When the interference sensing circuit is in the quiescent state a condenser 133 is charged to a negative voltage by way of a high resistance 132. When the interference sensing relay becomes operative the contact A is switched over, with the result that this negative charge is supplied by the way of a relatively low resistance 129 to the input circuit 123 of the Miller integrator in the interference sensing circuit. It takes some time for this charge to disappear even in the case of the control voltage having changed to such an extent that it is no longer able to keep the interference sensing circuit in its operative state. Various resistances present in the circuits maintain the potential applied in this way to the input circuit of the Miller integrator in the interference sensing circuit in any case during a certain interval at a value which differs in the same sense from the quiescent value as the control voltage which initiated the operation of the relay 128. Consequently, the Miller integrator continues to integrate even if the control voltage produced by the automatic noise level limiting arrangement no longer has a value sufficient for maintaining such an integrating operation. This causes the interference sensing relay 128 to remain in its operative condition in any case during a certain interval after it has been brought into this condition. In this condition the condenser 131 of the carry-on circuit is charged to a positive voltage by way of a high resistance 130. If the interference sensing relay 128 is now released again because the level of the interference has been reduced, and the control voltage consequently becomes less negative, then the contact A applies the positive charge of the condenser 131 to the input circuit of the Miller integrator, so that the said Miller integrator, after having returned to its quiescent state, will certainly remain in this state until the condenser 131 has to a certain extent been discharged. Before this discharge has been effected the control voltage supplied by the automatic noise level limiting arrangement is unable to make the interference sensing relay 128 operative again. Although the resistances by means of which the condensers 131 and 133 are charged are very high, nevertheless the limit of the input voltage at which the interference sensing circuit becomes operative or returns to the quiescent state after the discharge of the condenser connected to its input circuit changes slightly as the result of the switch-over of the contact A. In connection therewith the voltage applied by way of the resistance 134 to the input circuit of the interference sensing circuit is also changed. This change is effected by the switch-over of the contact B of the interference sensing relay, which as soon as the interference sensing relay becomes operative, connnects the resistance 134 to a tap of another voltage divider 136, which voltage divider applies a voltage to this resistance differing slightly from the voltage supplied by the voltage divider 135.

It will be related below that this switch-over also serves another purpose. The carry-on circuit described is by no means the only possible one. Radar apparatuses according to the invention have been built in which carry-on circuits of another construction have been applied. All carry-on circuits conceived, however, have in common that the interference sensing relay switches over a condenser circuit in such a way that the condenser is either charged or discharged. The circuit in which the charge or discharge is effected is connected in such a way to the input circuit of the integrator in the interference sensing circuit that the charging or discharging maintains during at least a certain interval an input voltage at the integrator input circuit which differs in the same sense from the quiescent value of this voltage as the voltage which initiaited the change in the state of the interference sensing relay.

Certain radar apparatus provided with anti-jamming or anti-interference arrangements according to the invention are built in such a way that when the anti-jamming or anti-interference arrangement is operative the transmission of transmitter pulses is interrupted. This interruption is controlled by a contact of the interference sensing relay 128. In this case it is desirable for the radar apparatus to be able to follow the direction from which the interference is received, for if the interference is a result of jamming by the target or if the target reflects a substantial amount of interference energy to the aerial of the radar apparatus, an aerial following the direction of the interference will remain aimed at the target. Because no echoes are received under these conditions, the control of the amplification would be effected by the noise level limiting arrangement, and this is undesirable, because this arrangement adjusts the level of the noise to a value which is insufficient for an adequate control of the auto-follow system aiming the aerial. In order to overcome this deficiency the contact C of the interference sensing relay 128 disconnects the output circuit of the noise level limiting arrangement from the input circuit of the "OR" circuit 114 to which it was connected, so that the automatic gain control circuit 119 obtains the complete control over the amplification control connection 121. Under these conditions the interference sensing circuit must no longer co-operate with the automatic noise level limiting arrangement. Even if the noise level received by the aerial is relatively low the automatic gain control circuit will be able to increase the gain to such an extent that the noise applied to the input circuit of the noise level limiting arrangement will cause this circuit to supply an output voltage which is sufficient to maintain the operative condition of the interference sensing circuit. The interference sensing circuit, once made operative, would then remain operative forever. In connection therewith the contact C disconnects the input circuit of the interference sensing circuit from the output circuit of the automatic noise level limiting arrangement and connects it to the output circuit of the automatic gain control circuit. These switching operations require, however, some further special measures. Because the automatic gain control circuit adjusts a higher noise level at the gate system 117 than the noise level limiting arrangement, the same level of the interference received by the aerial will cause the interference sensing circuit to receive a less negative control voltage from the automatic gain control circuit than from the automatic noise level limiting arrangement. If the noise level is not so very high immediately after the switchover, the input circuit of the interference sensing circuit will receive too low a voltage from the automatic gain control circuit for remaining operative so that it will return to its quiescent state after the delay interval determined by the carry-on circuit, even if the frequency or the polarization direction has been insufficiently changed for suppressing the interference. Directly after its return to the quiescent state the interference sensing circuit would then again receive a voltage from the automatic noise level limiting arrangement sufficient to make it operative again, so that after the delay interval determined by the carry-on circuit has elapsed it would return to its operative state. In this case even the carry-on circuit would be unable to prevent a chattering operation of the interference sensing relay.

If the noise level is so high that even the automatic gain control circuit supplies a sufficient control voltage for maintaining the operative state of the interference sensing circuit, the conditions described above will be fulfilled again directly after the noise level, as the result of the operation of the anti-jamming arrangement, has been described to a certain extent but not sufficiently for ensuring an efficient operation of the apparatus. In this case also the interference sensing relay 128 would eventually chatter. In order to ensure an undisturbed operation, the contact B changes the limit at which the interference sensing circuit becomes operative to a considerably larger extent than would be required in connection with the voltage change effected by the carry-on circuit. As a result of the switch-over of the contact B the interference sensing circuit will remain operative at a substantially less negative input voltage. Nevertheless, at the moment the interference sensing circuit returns to its quiescent state the automatic noise level limiting arrangement would, without special measures, apply a sufficient voltage to the interference sensing circuit to make it operative again because the automatic gain control circuit adjusts the noise at the input circuit of the automatic noise level limiting arrangement at a level which is far too high for this arrangement. It may be true that if the following of the direction of the interference has been effective and, moreover, the gate circuit 117 is still synchronized with the expected time of arrival of the echo pulses, the automatic gain control circuit will immediately take over the gain control as soon as the interference sensing circuit in returning to its quiescent state has made the transmitter operative again and adapt the amplification to the strength of the echo pulses received, so that the noise level will be decreased; but it would take some time for the Miller integrator 112 in the automatic noise level limiting arrangement to become adapted to this new state of affairs and the interval required for this adaptation is too large to be bridged by a normal carry-on circuit. In connection therewith, as long as it is in its operative condition, the contact D of the interference sensing relay 128 applies a negative voltage by way of a resistance 109 to the input circuit of the automatic noise level limiting arrangement, so that the Miller integrator in this arrangement will start its operation from the quiescent state determined by the diode 110 when the said contact is opened again at the moment the pulse transmission is resumed. The combined influence of the delay intervals resulting from the operation of the said Miller integrator and of the carry-on circuit becoming available in this way will be sufficient for the automatic gain control circuit to be able to adapt the amplification to the echo pulses received, after which the noise level at the input circuit of the noise level limiting arrangement will be below the maximum permissible value.

Figure 2:
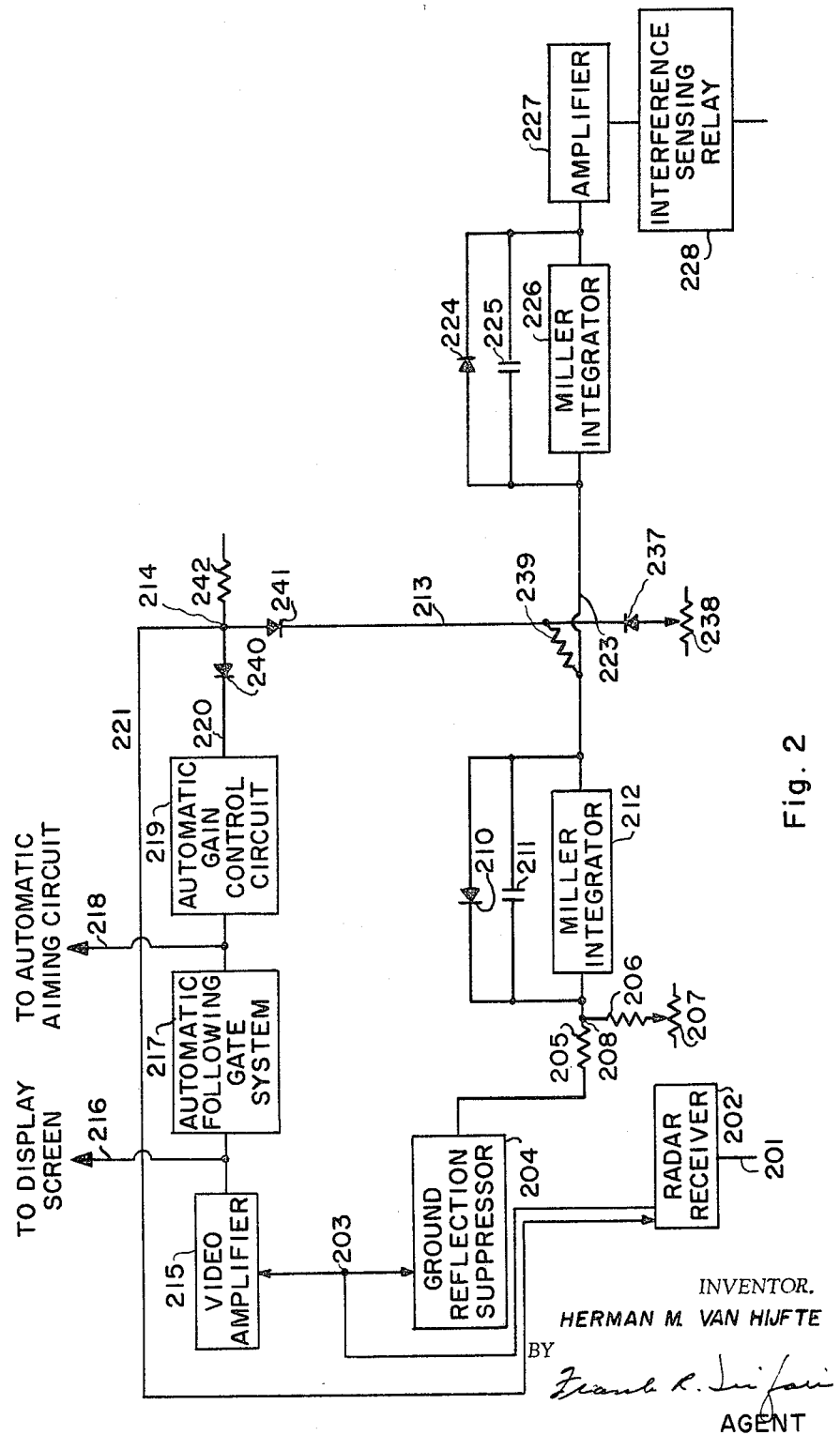
FIGURE 2 shows a second embodiment of such a circuit.

FIGURE 2 shows a simplified and even more effective version of the circuit according to the invention, in which the larger part of the required switch-over operations is effected electronically. Apart from the limiting of the noise level control voltage described below, the gain control and the noise level limiting operation in this circuit are effected in the same way as described in connection with the embodiment according to FIGURE 1. The circuit shown in FIGURE 2 comprises a receiver 202 which supplies video signals to a video amplifier 215 and this video amplifier supplies the amplified video voltages by way of circuit 216 to a display screen, and furthermore to an automatically following gate system 217, which selects an echo received from a certain target and supplies it by way of circuit 218 to an autofollow circuit for aiming the aerial. The automatic gain control circuit 219 controls, in the way described in connection with FIGURE 1, the level of the echo pulses passing the gate circuit, for which purpose it supplies, by way of an "OR" circuit 214 with a resistance 242 and the diodes 240 and 241, a control voltage for the amplification to the receiver 202 by way of the amplification control connection 221, as long as the noise level limiting arrangement does not furnish a control voltage requiring a larger reduction in the amplification. On the other hand, the receiver supplies video voltages by way of a ground return suppressor 204 and a voltage divider 205, 206 to the input circuit 208 of the Miller integrator 212 in an automatic noise level limiting arrangement. These video voltages are not selected by a narrow gate and consequently comprise the echo pulses as well as the noise-, interference- and jamming voltages, so that under normal conditions they correspond mainly to the noise-, interference- and jamming voltage. The noise level limiting arrangement supplies the output voltage of its Miller integrator 212 by way of a resistance 239 to the diode 241 of the "OR" circuit. The voltage supplied to this input circuit of the "OR" circuit is limited by a limiter with a diode 237 and a voltage divider 238. The limit level can be adjusted by setting the said voltage divider. As long as the levels of the noise and the echoes at the input circuit of the receiver are not so high, that at least one of the control voltages supplied by the automatic gain control circuit and the automatic noise level limiting arrangement is beyond the limit defined by the limiter with the diode 237, this circuit will operate in the same way as the circuit shown in FIGURE 1, and in principle this mode of operation can be derived from the description of the operation of the system shown in FIGURE 1, when the first figure in each reference number is changed from 1 into 2. If, however, the control voltage applied by the automatic gain control circuit is above the said limit level then the automatic noise level limiting arrangement can no longer take over the control of the amplification. The relative strength of noise and echoes at the input circuit of the receiver has no further influence on this fact.

The input circuit of the Miller integrator 226 with the condenser 225 in the interference sensing circuit is directly connected to the output circuit of the Miller integrator in the automatic noise level limiting arrangement. The output voltage of this Miller integrator is limited by a diode 224. The voltage at which it starts integrating differs from the quiescent value of the output voltage of the integrator in the automatic noise level limiting arrangement by at least as much as and preferably more than the limit value for the control voltage in the control circuit 213 defined by the limiter with diode 237.

The automatic gain control circuit causes the pulses passing through the gating system 217 to obtain the amplitude required for an effective autofollow operation of the aerial. If the echoes have sufficient strength for this purpose then the control voltage applied to the amplification control connection 221 by the automatic gain control circuit differs more from the quiescent value of the control voltages than the voltage which the limiter with the diode 237 permits the automatic noise level limiting arrangement to supply to the "OR" circuit. Consequently, during normal operation it is impossible for the automatic noise level limiting arrangement to take over the control of the amplification, even if the noise level increases to a value which is above the limit established by the said arrangement. Although the Miller circuit 212 in the noise level limiting arrangement starts integrating under these circumstances, so that the difference between the value of the output voltage and its quiescent value increases, the voltage applied to the "OR" circuit is limited by the diode 237 so that it remains nearer to the quiescent value of the control voltages than the voltage supplied by the automatic gain control circuit. The input circuit of the interference sensing circuit is directly connected, however, to the output circuit of the Miller integrator 212 of the automatic noise level limiting arrangement, so that there is no reason why this voltage should not pass the limit established by the limiter with the diode 237. Consequently, the Miller integrator 226 in the interference sensing circuit starts integrating and in the way described in connection with FIGURE 1, causes the interference sensing relay 228 to become operative. Consequently, the frequency, for instance, of the radar apparatus is changed and the pulse transmission is interrupted. Under these circumstances only noise voltages are supplied to the automatic control circuit 219, so that this circuit will apply such a control voltage to the amplification control connection 221 that the noise voltages supplied by the output circuit of the gate system 217 will have a suitable value for controlling the autofollow operation of the aerial. Under these conditions the noise voltages applied to the Miller integrator in the automatic noise level limiting arrangement will further increase in amplitude. This, however, will have no result because the noise level was already too high, and consequently the Miller integrator already supplied an output voltage differing greatly from its quiescent value. When the interference level becomes lower as a result of the operation of the anti-jamming arrangement, for instance, because the frequency has been changed, then the difference between the value of the control voltage supplied by the automatic gain control circuit and its quiescent value also decreases. As soon as this voltage comes within the limits established by the limiter with the diode it loses its influence on the amplification because then the "OR" circuit 214 interrupts the connection between the automatic gain control circuit and the amplification control connection 221. For the time being the interference sensing circuit continues to receive a voltage from the automatic noise level limiting arrangement which is sufficient to maintain the operative condition of this circuit. Consequently the frequency changing operation continues, so that the noise level at the input circuit of the automatic noise level limiting arrangement continues to decrease and eventually reaches a level which is lower than that at which the Miller integrator in the automatic noise level limiting arrangement starts integrating. Then the output voltage of the automatic noise level limiting arrangement returns to its quiescent value, so that the interference sensing circuit also returns to its quiescent state. The transmitter resumes its transmitting operation and the automatic gain control will adjust the amplitude of the echo pulses then passing the gate system to the value required for the autofollow operation of the aerial, so that, as a rule, the noise voltages applied to the input circuit of the noise level limiting arrangement decrease still further.

If the received echo pulses are very weak, it is possible for the voltage supplied by the automatic gain control circuit to remain within the limits established by the limiter with the diode 237. If the noise increases under these circumstances, it is possible for the automatic noise level limiting arrangement to take over the gain control. Nevertheless the interference sensing circuit will be able to operate in its normal way in order to take measures for the purpose of reducing the interference level.

It is obvious that an automatically following gate system, such as 117 and 217 will not remain synchronized with the expected moment of arrival of the target echoes during the interval in which the interference sensing circuit has interrupted the operation of the transmitter. As a result of slight differences between the durations of the gating pulses and small deficiencies in the balancing of the circuits controlling the automatic following operation of the gate pulses, drift of these pulses will probably occur, so that the moment of occurrence of the gating pulses with respect to the synchronizing pulses applied to the transmitter will change. Moreover, the moment of occurence of the gating pulses should remain adapted to the changing distance to the target. During a restricted interval a computer or a memory system, capable of supplying the probable rate of change of the distance, or a hold rate circuit which maintains the rate of change of the moment of occurrence of the gating pulses constant, can control these pulses in such a way that they will occur at the moment at which the echo pulses would probably be received if the transmitter were operative. It may be that nevertheless, after the anti-jamming operation has been effected, the gating pulses are no longer synchronized with the echo pulses then received. The renewed synchronization of the gating pulses and the echo pulses can be left to the operator of the apparatus. One of the well-known automatic synchronizing systems which search for echoes through the distance range can also be applied, e.g. the system described in the United States Patent No. 3,147,475.

In order to be able to change the polarization direction of the radar apparatus, one of the well-known types of aerials with variable polarization direction can be applied. For example, the polarization direction may be varied by rotating a linearly polarized radar antenna. This is schematically illustrated in FIG. 1, wherein a motor 140, energized by way of contact E of relay 128, is mechanically coupled to the antenna 141. A frequency change is preferably effected in the following way. A servo motor 140, made operative by the interference sensing relay, changes, as long as it is operative, the adjustment of the frequency setting element of the transmitter magnetron 142 which is a magnetron with variable frequency, so that this magnetron will change its frequency from the setting reached at that moment in an arbitrary sense to one of the limits of its frequency range and then in the opposite direction through the whole frequency range and so on upwards and downwards until an undisturbed frequency has eventually been found. A very small part of the transmitting energy is applied to a mixer stage which also receives the voltage supplied by the heterodyne generator of the receiver. This mixer stage will consequently supply the same frequency as the mixer stage of the receiver. The voltage produced by the former mixer stage is applied to a frequency discriminator which produces no output voltage if the frequency applied to it is equal to the tuning frequency of the intermediate frequency amplifier and produces a direct voltage, the sign of which is determined by the sense of the deviation of the frequency from the said value, as soon as the frequency supplied by the mixer differs from the said intermediate frequency. The output voltage of this frequency discriminator controls a servo motor which adjusts the tuning element of the heterodyne generator of the receiver. The direction in which this tuning element is driven is such that the frequency deviation is decreased. The application of this type of frequency control is only possible if the magnetron continues to operate when the transmission of transmitter pulses by the aerial is interrupted. For this reason the transmission of pulses in these circuits is not interrupted by switching off the magnetron, but by leading the transmitter energy to a load instead of to the transmit-receive circuit. For example, the output of the magnetron 142 may be applied to the antenna 141 by way of a waveguide switch 151 and a transmit-receive switch 150, in that order. The transmit-receive switch is of conventional construction, and is employed to direct energy from the antenna 141 to the receiver 102 by way of input circuit 101. The waveguide switch 151 is operated by means of contacts F of relay 128 for switching the output of the magnetron to a dummy load 152. The waveguide switch may be of any well-known type, e.g. of the type operating by means of a small movable vane switched over by an electro magnet.

In principle it would be possible for the tuning element of the heterodyne generator of the receiver to be driven by the servo motor controlled by the interference sensing relay, in this way causing a change in the frequency to which the receiver is tuned, and to effect an adaptation of the transmitter frequency to the tuning of the receiver under the control of a frequency discriminator of the type described above or in some other way. In some embodiments of this type it would be possible to interrupt the operation of the magnetron completely. For various reasons this method is not recommendable, amongst other things because the frequency adjustment of the magnetron operates more slowly than that of the heterodyne generator, so that after the suppression of the interference it would probably be necessary to wait some time for the slower operating magnetron to adapt its frequency setting.

Instead of a Miller integrator, an amplifier with a small band-width and consequently delayed operation could be applied in the automatic noise level limiting arrangement and in the interference sensing circuit. It is, however, an important advantage of the Miller integrator that it is simple and inexpensive and nevertheless permits a very high amplification as well as a suitably delayed operation.

What I claim is:

1. A radar apparatus comprising transmitter means for transmitting pulses of electromagnetic energy, means for varying a characteristic of said energy, receiver means for receiving echo signals, means for producing a first gain control voltage responsive to substantially the total output of said receiver means, means for producing a second gain control voltage responsive to the output of said receiver means during a selected interval of time subsequent the transmission of each pulse by said transmitter means, means for applying the larger of said control voltages to said receiver means for controlling the amplification therein, means for producing a control signal responsive to the amplitude of said first gain control voltage, and means for applying said control signal to said means for varying a characteristic, whereby said characteristic is varied when the average output of said receiver means exceeds a predetermined level.

2. A radar apparatus comprising transmitter means for transmitting pulses of electromagnetic energy, means for varying at least one of the frequency and polarization characteristics of said energy, receiver means for receiving echo signals, means for producing a first gain control voltage comprising first integrating means responsive to substantially the total output of said receiver means, means for producing a second gain control voltage responsive to the output of said receiver means during a selected interval of time subsequent the transmission of each pulse by said transmitter means, means for applying the larger of said control voltages to said receiver means for controlling the amplification therein, means for inhibiting the application of said first control voltage to said receiver means when said first voltage exceeds a predetermined level, means for producing a control signal comprising second integrating means responsive to said first gain control voltage when it exceeds a predetermined level, and means for applying said control signal to said means for varying at least one characteristic, whereby said characteristic is varied when the average output of said receiver means exceeds a predetermined level.

3. A radar apparatus comprising transmitter means for transmitting pulses of electromagnetic energy, means for varying at least one of the frequency and polarization characteristics of said energy, receiver means for receiving echo signals, means for producing a first gain control voltage comprising first integrating means responsive to substantially the total output of said receiver means when said output exceeds a first predetermined level, automatic following gate means connected to said receiver means for providing an output signal only during selected time intervals, means for producing a second gain control voltage responsive to the output of said automatic following gate means, means for applying the larger of said gain control voltages to said receiver means for controlling the amplification therein, second integrating means, means connecting said second integrating means to the output of said first integrating means for producing a control signal responsive to the output of said receiver means when it exceeds a second predetermined level higher than said first level, and means applying said control signal to said means for varying at least one characteristic, whereby said characteristic is varied when the average output of said receiver means exceeds said second level.

4. An anti-jamming radar system comprising transmitter means for transmitting pulses of electromagnetic energy, means for varying at least one of the frequency and polarization characteristics of said energy, receiver means for receiving echo signals, automatic following gate means connected to said receiver means for providing an output signal only during selected time intervals, automatic gain control means for producing a first voltage responsive to the output of said gate means, automatic noise level limiting means connected to said receiver means for producing a second voltage responsive to substantially the total output of said receiver means when said output exceeds a first predetermined level, OR circuit means for applying the one of said first and second voltages which will cause the largest decrease in amplification to said receiver means for controlling the gain thereof, interference sensing circuit means comprising integrating means for producing a control signal responsive to voltages applied thereto exceeding a second predetermined level, means for applying said second voltage to said interference sensing circuit means, and means applying said control signal to said means for varying at least one characteristic whereby said characteristic is varied when the average output of said receiver means exceeds said first predetermined level by a predetermined amount.

5. The system of claim 4 further comprising a capacitor, a charging circuit for said capacitor, and means responsive to said control signal for connecting said capacitor to the input of said interference sensing means whereby the state of said control signal is maintained for a predetermined interval.

6. The system of claim 4 further comprising means responsive to said control signal for disconnecting said automatic noise level limiting circuit from said OR circuit, for removing said second voltage from said interference circuit, and for applying said first voltage to the input of said interference sensing circuit.

7. The system of claim 4 wherein said interference sensing circuit means further comprises a voltage divider circuit of first and second serially connected resistors, means applying said second voltage to one end of said divider circuit, means connecting the other end of said divider circuit to a point of constant potential, and means connecting the junction of said first and second resistors to the input of said integrating means.

8. The system of claim 7 further comprising means responsive to said control signal for disconnecting said other end of said divider from said point of constant potential and connecting it to a second point of constant potential of magnitude different from the potential at said first mentioned point.

9. An anti-jamming radar system comprising transmitter means for transmitting pulses of electromagnetic energy; means for varying at least one of the frequency and polarization characteristics of said energy; receiver means for receiving echo signals; automatic following gate means connected to said receiver means for providing an output signal only during selected time intervals; automatic gain control means for producing a first voltage responsive to the output of said gate means; automatic noise level limiting means connected to said receiver means for producing a second voltage responsive to substantially the total output of said receiver means when said output exceeds a first predetermined level; OR circuit means for applying the one of said first and second voltages which will cause the largest decrease in amplification to said receiver means for controlling the gain thereof; interference sensing circuit means comprising integrating means for producing a control signal responsive to voltages applied thereto exceeding a second predetermined level; means connecting the output of said automatic noise level limiting means to the input of said interference sensing means; and means responsive to said control signal for activating said means for varying said characteristic, disconnecting said automatic noise level limiting means from said OR circuit and said interference sensing circuit means and applying said first voltage to said interference sensing means, interrupting pulse transmission by said transmitter means, and for applying a voltage to the input of said automatic noise level limiting means for preventing it from producing an output voltage, when the average output of said receiver means exceeds said first predetermined level by a predetermined amount.

10. An anti-jamming radar system comprising transmitter means for transmitting pulses of electromagnetic energy; means for varying at least one of the frequency and polarization characteristics of said energy; receiver means for receiving echo signals; automatic following gate means connected to said receiver means for providing an output signal only during selected time intervals; automatic gain control means for producing a first voltage responsive to the output of said gate means; automatic noise level limiting means connected to said receiver means for producing a second voltage responsive to substantially the total output of said receiver means when said output exceeds a first predetermined level; OR circuit means for applying the one of said first and second voltages which will cause the largest decrease in amplification to said receiver means for controlling the gain thereof; voltage limiting means connected to said OR circuit means whereby the maximum amplitude of said second voltage applied to said OR circuit means is limited to a second predetermined level, interference sensing circuit means comprising intergrating means for producing a control signal responsive to voltages applied thereto exceeding a third predetermined level, and means applying said control signal to said means for varying at least one characteristic whereby said characteristic is varied when the average output of said receiver means exceeds said first predetermined level by a predetermined amount.

11. The system of claim 10 wherein said third predetermined level is at least as great as said second predetermined level.

12. The system of claim 10 in which said OR circuit means comprises an output junction connected to said receiver means, first diode means connected between said junction and said automatic gain control means, and a series circuit of resistance means and a second diode connected in that order between said automatic noise level limiting means and said junction, and said voltage limiting means is connected to the junction of said second diode and said resistance means.

13. In a radar system of the type comprising a receiver for receiving echo signals, a first gain control circuit for producing a first voltage responsive to the output of said receiver during predetermined time intervals, a second gain control circuit for producing a second voltage responsive to the total average output of the receiver above a first predetermined level, and means for applying one of said first and second voltages to said receiver which will cause the greatest decrease in amplification, means for producing a control signal responsive to the receipt of excessive interference signals by said receiver, said means for producing said control signal comprising integrating circuit means, means applying said second voltage to said integrating circuit means, said integrating circuit means having a threshold of integration that is a predetermined amount greater than the amplitude of said second voltage when the output of said receiver is at said first predetermined level, and means inhibiting the application of said second voltage to said receiver means when the average output of said receiver exceeds a second predetermined level.

References Cited by the Examiner

UNITED STATES PATENTS

| 2,464,258 | 3/1949 | Pritchard | 343—18 |
| 2,538,028 | 1/1951 | Mozley | 343—17.1 |
| 3,050,726 | 8/1962 | Laurent | 325—42 |
| 3,061,830 | 10/1962 | Gray et al. | 325—480 |

CHESTER L. JUSTUS, *Primary Examiner.*

DAVID G. REDINBAUGH, *Examiner.*

B. V. SAFOUREK, T. H. TUBBESING,
*Assistant Examiners.*

UNITED STATES PATENT OFFICE
CERTIFICATE OF CORRECTION

Patent No. 3,281,837                          October 25, 1966

Herman M. van Hijfte

It is hereby certified that error appears in the above numbered patent requiring correction and that the said Letters Patent should read as corrected below.

Column 6, line 43, for "prouced" read -- produced --;
column 8, line 66, for "initiaited" read -- initiated --;
column 9, line 64, for "described" read -- decreased --.

Signed and sealed this 15th day of August 1967.

(SEAL)
Attest:

Edward M. Fletcher, Jr.                            EDWARD J. BRENNER
Attesting Officer                                    Commissioner of Patents